United States Patent
Ahn et al.

(10) Patent No.: US 10,318,049 B2
(45) Date of Patent: Jun. 11, 2019

(54) TOUCH PANEL

(71) Applicant: DONGWOO FINE-CHEM CO., LTD., Jeollabuk-do (KR)

(72) Inventors: Gi Hwan Ahn, Gyeonggi-do (KR); Sung Ho Baek, Gyeonggi-do (KR); Jung Ku Lim, Chungcheongnam-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 2 days.

(21) Appl. No.: 15/315,450

(22) PCT Filed: May 26, 2015

(86) PCT No.: PCT/KR2015/005225
§ 371 (c)(1),
(2) Date: Dec. 1, 2016

(87) PCT Pub. No.: WO2015/186918
PCT Pub. Date: Oct. 12, 2015

(65) Prior Publication Data
US 2017/0102818 A1 Apr. 13, 2017

(30) Foreign Application Priority Data
Jun. 3, 2014 (KR) .................. 10-2014-0067483

(51) Int. Cl.
*G06F 3/044* (2006.01)
*G06F 3/041* (2006.01)

(52) U.S. Cl.
CPC ............ *G06F 3/0416* (2013.01); *G06F 3/044* (2013.01); *G06F 3/0412* (2013.01); *G06F 2203/04103* (2013.01); *G06F 2203/04111* (2013.01)

(58) Field of Classification Search
CPC ...... G06F 3/0416; G06F 3/0412; G06F 3/044; G06F 2203/04103; G06F 2203/04111;
(Continued)

(56) References Cited

U.S. PATENT DOCUMENTS

2012/0206403 A1\* 8/2012 Wang .................. G02F 1/13338
345/174
2012/0256642 A1\* 10/2012 Badaye .................. G06F 3/044
324/658

(Continued)

FOREIGN PATENT DOCUMENTS

CN 102239462 A 11/2011
CN 103092391 A 5/2013
(Continued)

OTHER PUBLICATIONS

International Search Report for PCT/KR2015/005225.

*Primary Examiner* — Richard J Hong
(74) *Attorney, Agent, or Firm* — The PL Law Group, PLLC

(57) ABSTRACT

A touch screen panel disposed at the visible side of a display panel includes a sensing pattern formed on one visible side surface of a substrate, and a metal wiring disposed on a top side of a region corresponding to a boundary between pixels in the display panel on the above surface, which connects the sensing pattern with a pad part, thus exhibiting improved touch sensitivity and excellent transmittance.

16 Claims, 7 Drawing Sheets

(58) Field of Classification Search
CPC .............. G06F 1/1643; G02F 1/13338; G02F 1/134309; H05K 3/46
See application file for complete search history.

(56) References Cited

U.S. PATENT DOCUMENTS

| | | |
|---|---|---|
| 2014/0085214 A1 | 3/2014 | Cok |
| 2014/0160401 A1* | 6/2014 | Yonemura .......... G02F 1/134309 349/96 |
| 2015/0114815 A1* | 4/2015 | Chang ....................... H05K 3/46 200/5 R |
| 2015/0338953 A1* | 11/2015 | Liu ........................ G06F 3/044 345/174 |
| 2017/0003821 A1* | 1/2017 | Jeon ....................... G06F 1/1643 |

FOREIGN PATENT DOCUMENTS

| | | | | |
|---|---|---|---|---|
| CN | 103293734 A | | 9/2013 | |
| KR | 10-2010-0084263 A | | 7/2010 | |
| KR | 10-2013-0136376 A | | 12/2013 | |
| KR | 20130133381 A | * | 12/2013 | ............. G06F 3/044 |
| KR | 10-2014-0028219 A | | 3/2014 | |
| KR | 20-2014-0001710 U | | 3/2014 | |
| WO | 2013-180438 A1 | | 12/2013 | |

\* cited by examiner

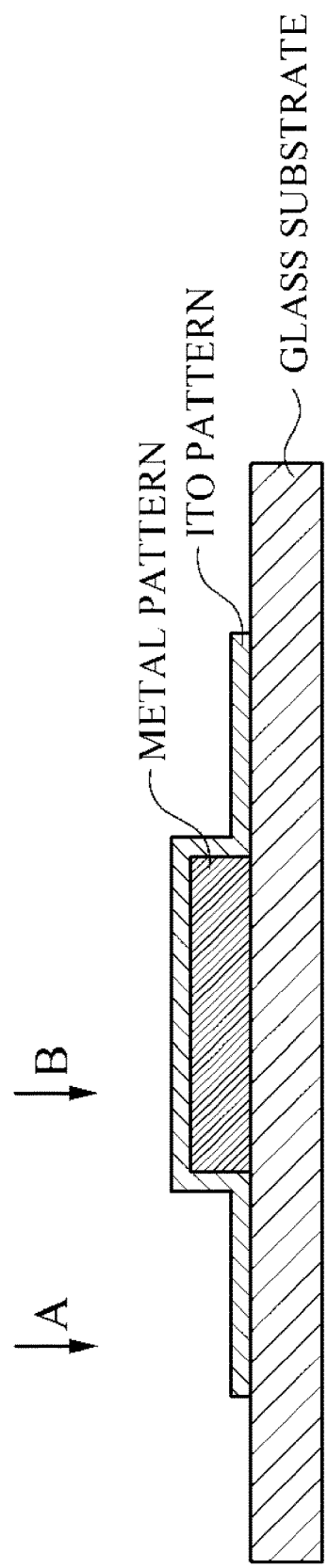

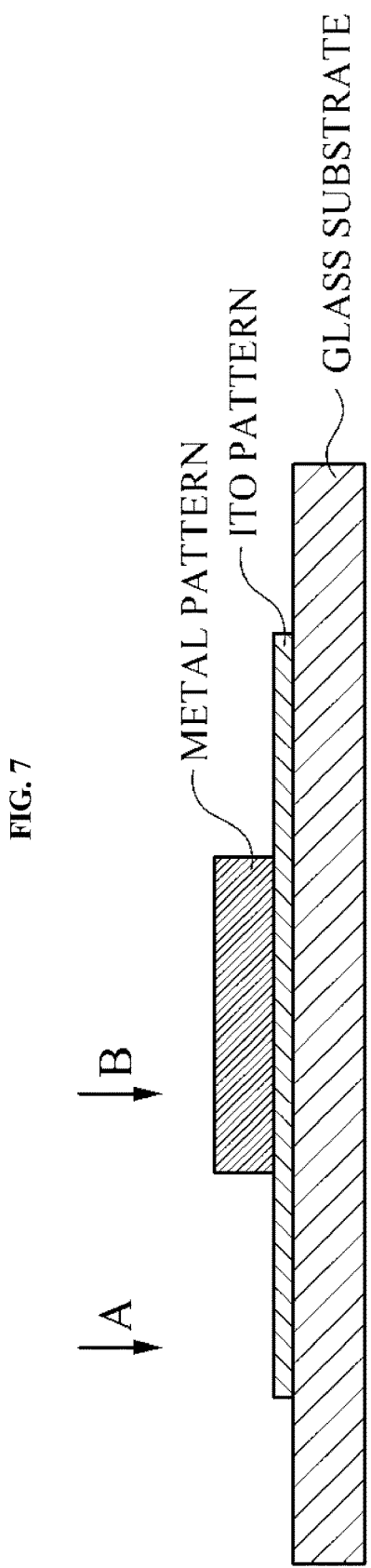

TOUCH PANEL

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2015/005225, filed May 26, 2015, which claims priority to the benefit of Korean Patent Application No. 10-2014-0067483 filed in the Korean Intellectual Property Office on Jun. 3, 2014, the entire contents of which are incorporated herein by reference.

FIELD OF THE INVENTION

The present invention relates to a touch screen panel.

DESCRIPTION OF THE RELATED ART

Commonly, a touch panel is a screen panel equipped with a special input device to receive position input by touching the screen with a finger of a user. Such a touch panel does not use a keyboard but has a configuration of multi-layer laminates wherein, when the finger of the user or an object touches a specific character or position displayed on a screen, the touch screen identifies the position and directly receives data from the screen, in order to practically process information at a specific position by a software stored therein.

In order to recognize the touched position without degrading the visibility of an image displayed on the screen, it is necessary to use a transparent sensing electrode in which sensing patterns are formed in a predetermined pattern in general.

As a transparent sensing electrode used in the touch panel, various structures are known in the related art. For example, a glass-ITO film-ITO film (GFF), a glass-ITO film (G1F), or a glass only (G2) structure may be used in the touch panel.

For example, as a conventional transparent sensing electrode, there is a structure illustrated in FIG. 1.

The transparent sensing electrode may be formed by first sensing patterns 10 and second sensing patterns 20. The first and second sensing patterns 10 and 20 are disposed in different directions from each other to provide information on X and Y coordinates of a touched point. Specifically, when the finger of the user or the object touches a transparent substrate, a change in capacitance depending on a contact position is detected and transferred to a driving circuit through the first and second sensing patterns 10 and 20, and a position detecting line. Then, the change in capacitance is converted to an electrical signal by X and Y input processing circuits (not illustrated) to identify the contact position.

In this regard, the first and second sensing patterns 10 and 20 have to be formed in the same layer of the transparent substrate, and the respective patterns have to be electrically connected with each other to detect the touched position. However, the second sensing patterns 20 are connected with each other while the first sensing patterns 10 are separated from each other in an island form, therefore, additional connection electrodes (bridge electrodes) 50 are needed to electrically connect the first sensing patterns 10 with each other.

However, the connection electrodes 50 should not be electrically connected to the second sensing patterns 20, and thus, should have to be formed in a layer different from the second sensing patterns 20. In order to show such a structure, FIG. 2 illustrates an enlarged view of a portion in which the connection electrodes 50 are formed in a cross-section taken on line A-A' of FIG. 1.

Referring to FIG. 2, the first and second sensing patterns 10 and 20 formed on a substrate 1 are electrically insulated from each other by an insulation film 30 formed thereon. In addition, as described above, since the first sensing patterns 10 have to be electrically connected with each other, these patterns are electrically connected with each other by using the connection electrodes 50.

In order to connect the first sensing patterns 10, which are separated in the island form, with each other by the connection electrodes 50 while being electrically isolated from the second sensing patterns 20, after forming the contact holes 40 in the insulation film 30, there is a need to execute an additional step of forming the connection electrodes 50.

As described above, additional processes for forming the contact holes 40 and the connection electrodes 50 are required in the transparent sensing electrode additionally including such connection electrodes 50, whereby defects such as an electrical short-circuit between the first sensing patterns 10 and the second sensing patterns 20 may occur during manufacturing processes, and electrical conductivity of sensing electrode patterns may be reduced due to a contact resistance between the connection electrodes and the sensing patterns.

In order to solve the above-described problems, Korean Patent Laid-Open Publication No. 2010-84263 discloses a technique that firstly forms connection electrodes on a transparent substrate, an insulation film and contact holes, and finally, first sensing patterns and second sensing patterns thereon, so as to improve problems in relation with the number of masks and the complexity of the process.

However, the technique disclosed in the Korean Patent Laid-Open Publication No. 2010-84263 may not basically solve the above-described problems, because it should be provided with additional connection electrodes.

SUMMARY

Accordingly, it is an object of the present invention to provide a touch screen panel having high electrical conductivity.

In addition, another object of the present invention is to provide a touch screen panel having excellent transmittance.

Further, another object of the present invention is to provide a touch screen panel with low visibility by reflectance difference at different positions.

(1) A touch screen panel disposed at a visible side of a display panel, including: a sensing pattern formed on one visible side surface of a substrate; and a metal wiring disposed on the one surface on a top side of a region corresponding to a boundary between pixels in the display panel, which connects the sensing pattern with a pad part.

(2) The touch screen panel according to above (1), wherein the sensing pattern is formed of at least one material selected from a group consisting of indium tin oxide (ITO), indium zinc oxide (IZO), zinc oxide (ZnO), indium zinc tin oxide (IZTO) and cadmium tin oxide (CTO).

(3) The touch screen panel according to above (1), wherein the sensing pattern includes a plurality of unit sensing patterns arranged at an interval, and the metal wiring extends from each unit sensing pattern to the bezel part closest thereto, to connect the sensing pattern with the pad part on the bezel part.

(4) The touch screen panel according to above (1), wherein the metal wiring is formed of molybdenum, silver, aluminum, copper, palladium, gold, platinum, zinc, tin, titanium or an alloy material thereof.

(5) The touch screen panel according to above (1), wherein the metal wiring has a thickness of 10 to 1,000 nm.

(6) The touch screen panel according to above (1), further including an auxiliary sensing pattern disposed on the one surface on the top side of the region corresponding to the boundary between pixels in the display panel, to cover the metal wiring.

(7) The touch screen panel according to above (6), wherein the auxiliary sensing pattern is formed of at least one material selected from a group consisting of indium tin oxide (ITO), indium zinc oxide (IZO), zinc oxide (ZnO), indium zinc tin oxide (IZTO) and cadmium tin oxide (CTO).

(8) The touch screen panel according to above (6), wherein the auxiliary sensing pattern has a thickness of 30 to 150 nm.

(9) A method of fabricating a touch screen panel, including: forming a sensing pattern on one visible side surface of a substrate; and forming a metal wiring on the one surface to connect the sensing pattern with a pad part, wherein the metal wiring is disposed on a top side of a region corresponding to a boundary between pixels in a display panel.

(10) The method according to above (9), wherein the sensing pattern is formed of at least one material selected from a group of indium tin oxide (ITO), indium zinc oxide (IZO), zinc oxide (ZnO), indium zinc tin oxide (IZTO) and cadmium tin oxide (CTO).

(11) The method according to above (9), wherein the sensing pattern includes a plurality of unit sensing patterns, which are formed to be arranged at an interval, and the metal wiring is formed to be extended from each unit sensing pattern to the bezel part closest thereto, to connect the sensing pattern with a pad part on the bezel part.

(12 The method according to above (9), wherein the metal wiring has a thickness of 10 to 1,000 nm.

(13) The method according to above (9), wherein the metal wiring is formed of molybdenum, silver, aluminum, copper, palladium, gold, platinum, zinc, tin, titanium or an alloy material thereof.

(14) The method according to above (9), further including forming an auxiliary sensing pattern on the one surface to cover the metal wiring.

(15) The method according to above (14), wherein the auxiliary sensing pattern is formed of at least one material selected from a group consisting of indium tin oxide (ITO), indium zinc oxide (IZO), zinc oxide (ZnO), indium zinc tin oxide (IZTO) and cadmium tin oxide (CTO).

(16) The method according to above (14), wherein the auxiliary sensing pattern has a thickness of 30 to 150 nm.

The touch screen panel of the present invention has a metal wiring to increase electrical conductivity of sensing patterns, thus exhibiting improved touch sensitivity.

In addition, the touch screen panel of the present invention has a metal wiring disposed on a top side of a region corresponding to a boundary between pixels, thus exhibiting excellent transmittance.

Further, the touch screen panel of the present invention may minimize a problem of visibility by reflectance difference at different positions.

BRIEF DESCRIPTION OF THE DRAWINGS

The above and other objects, features and other advantages of the present invention will be more clearly understood from the following detailed description taken in conjunction with the accompanying drawings, in which:

FIG. 6 is a vertical cross-sectional view of each laminate prepared in Preparative Examples 1 to 5; and FIG. 7 is a vertical cross-sectional view of each laminate prepared in Preparative Example 6.

DETAILED DESCRIPTION

The present invention provides a touch screen panel disposed at the visible side of a display panel, including: a sensing pattern formed on one visible side surface of a substrate; and a metal wiring disposed on a top side of a region corresponding to a boundary between pixels in the display panel on the above surface, which connects the sensing pattern with a pad part, thus exhibiting improved touch sensitivity and excellent transmittance.

[Touch Panel]

Figure 1:
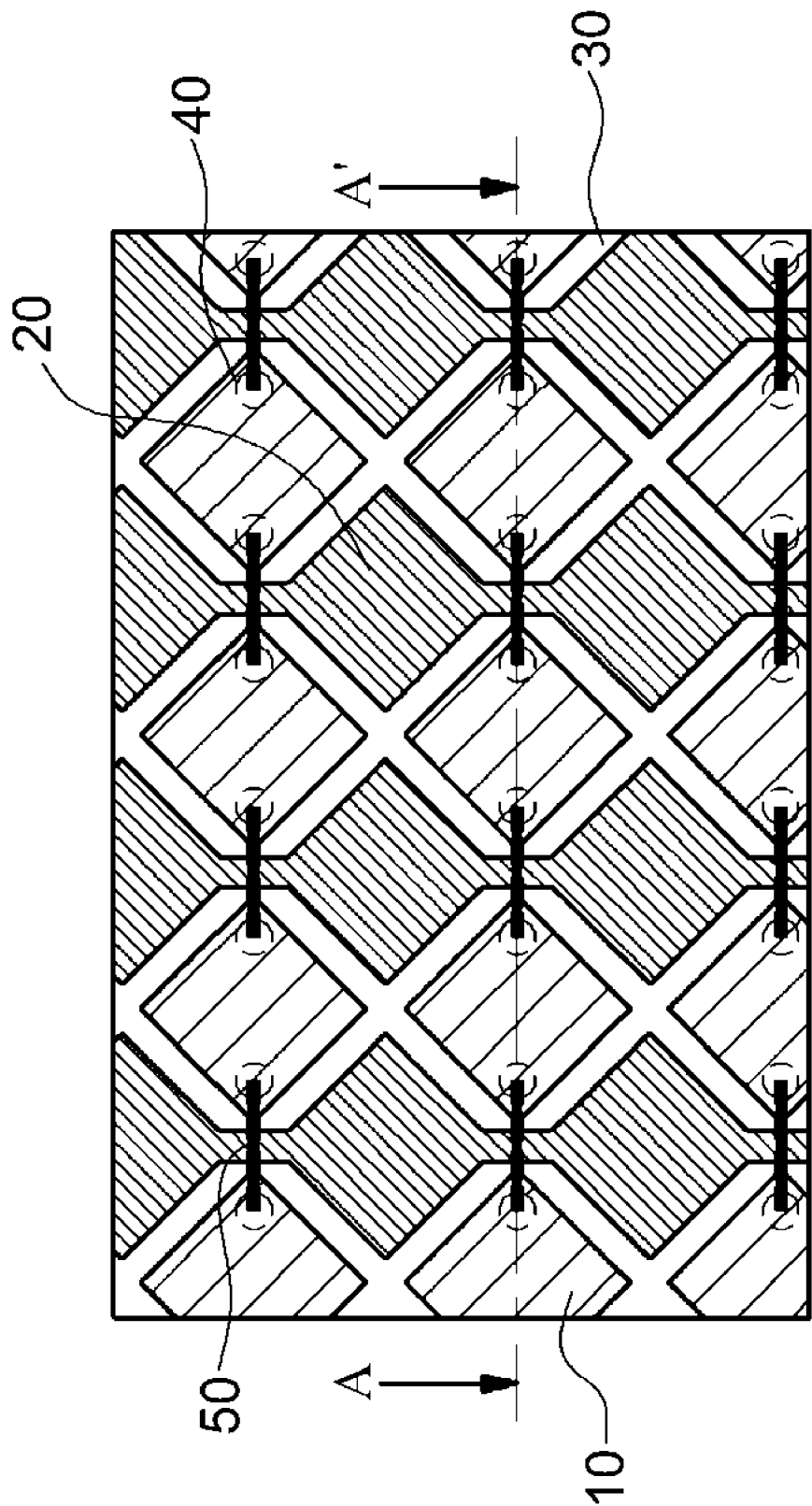
FIG. 1 is a schematic plan view of a conventional transparent sensing electrode.
Figure 2:
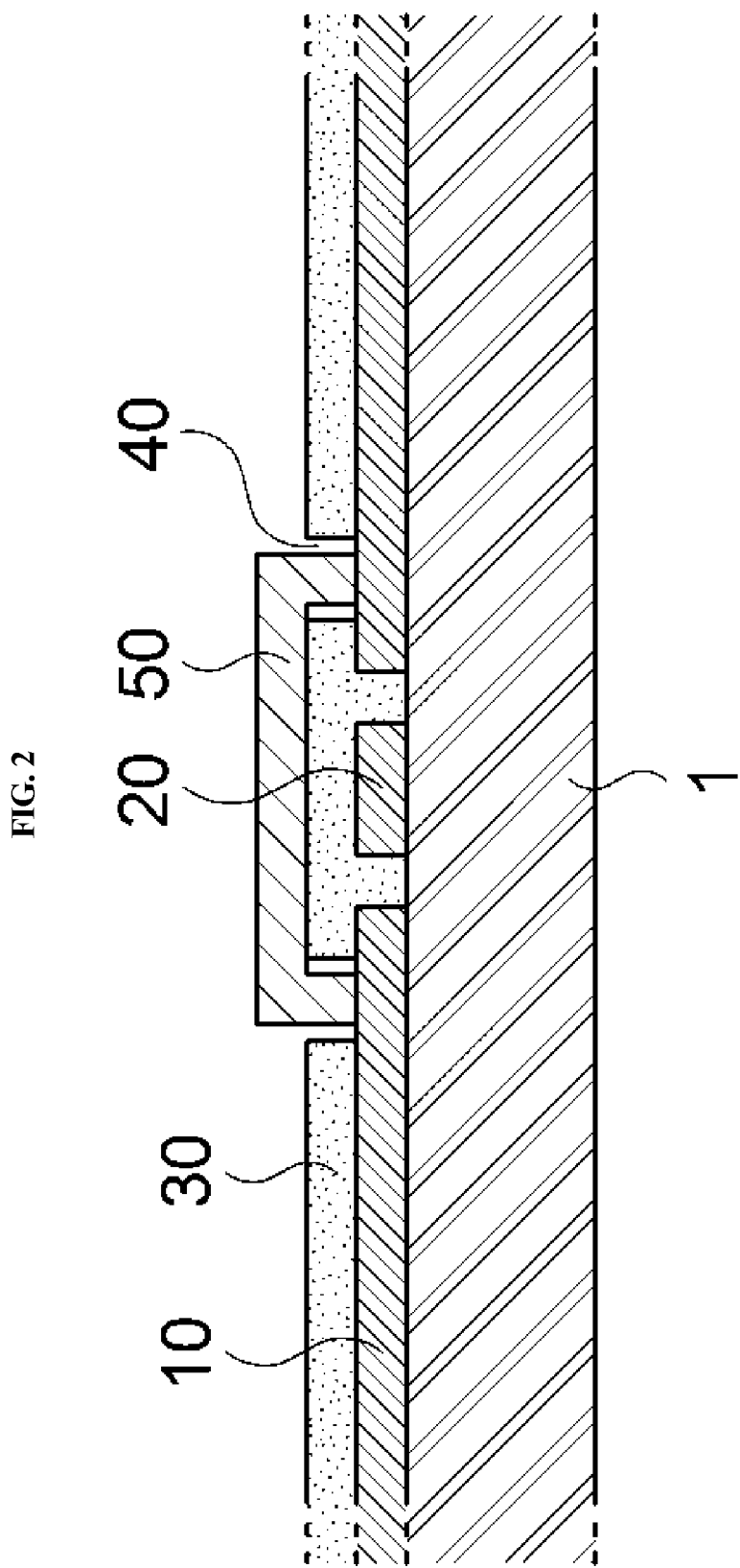
FIG. 2 is a schematic vertical cross-sectional view of a conventional transparent sensing electrode.
Figure 3:
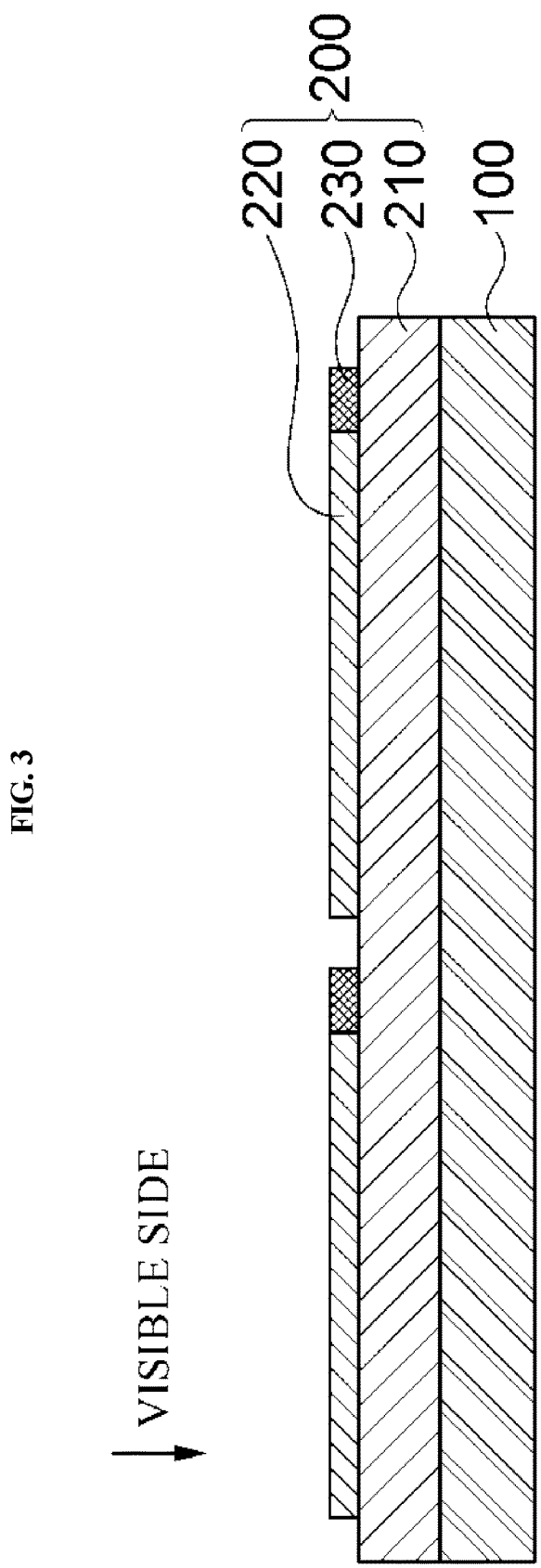
FIG. 3 is a schematic vertical cross-sectional view of a touch screen panel according to one embodiment of the present invention, which is disposed at one surface of a display panel.
Figure 4:
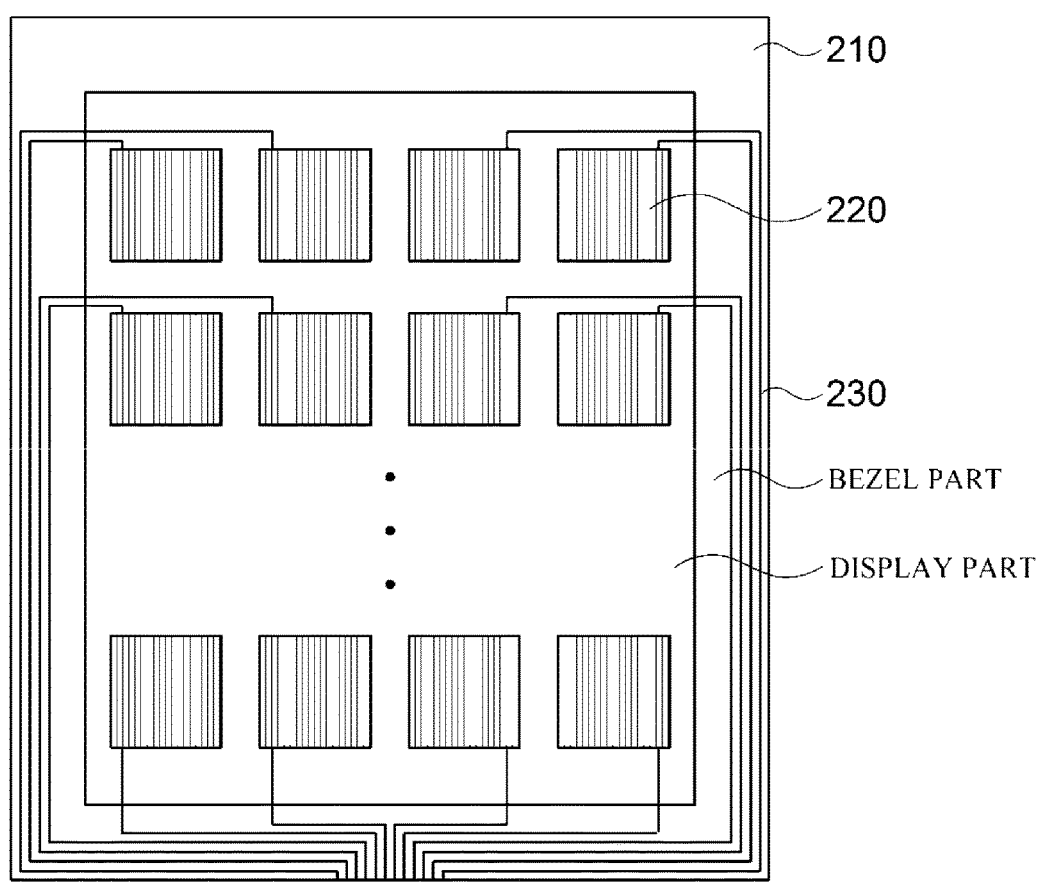
FIG. 4 is a plan view schematically illustrating an arrangement of a metal wiring and sensing patterns in the touch screen panel according to one embodiment of the present invention.
Figure 5:
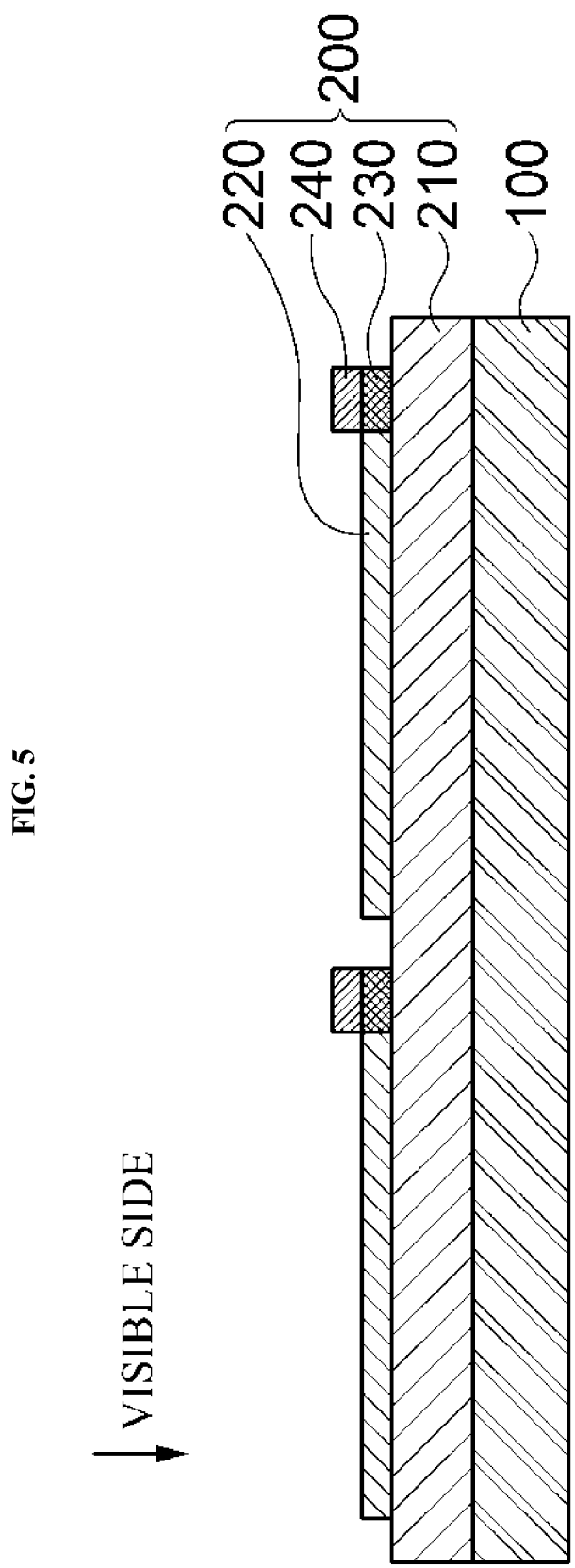
FIG. 5 is a schematic vertical cross-sectional view of the touch screen panel according to one embodiment of the present invention, which is disposed at one surface of a display panel.

FIGS. 3 to 5 are schematic vertical cross-sectional views of a touch screen panel according to one embodiment of the present invention, which is disposed at one surface of a display panel, and FIG. 4 is a plan view schematically illustrating an arrangement of a metal wiring and sensing patterns in the touch screen panel according to one embodiment of the present invention.

Hereinafter, the invention is described more fully with reference to the accompanying drawings, in which exemplary embodiments of the invention are illustrated. However, those skilled in the related art will appreciate that such embodiments are provided to further understand the spirit of the present invention and do not limit subject matters to be protected as disclosed in the detailed description and appended claims.

A touch screen panel 200 of the present invention is disposed on a visible side of a display panel 100.

The display panel 100 is not particularly limited, but may include, for example, a liquid crystal panel, OLED panel, or the like, which are commonly used in the related art. The OLED panel may be a RGB OLED panel having red, green and blue light emitting diodes, or a white OLED panel having a white light emitting diode.

If the display panel 100 is the liquid crystal panel or white OLED panel, a color filter having color patterns may be provided, and such color patterns of red, green and blue colors are arranged to correspond to red, green and blue sub-pixels, thereby expressing colors.

When the display panel 100 is the RGB OLED panel, red, green and blue light emitting diodes (LEDs) are arranged to correspond to the red, green and blue sub-pixels, respectively, thereby expressing colors.

The display panel 100 may include a first black matrix layer (not illustrated) to define a boundary between pixels.

The first black matrix layer may define the boundaries between respective pixels and respective sub-pixels, and severs to improve contrast.

In addition thereto, the display panel 100 according to the present invention may further include any technical configuration typically employed in the related art.

The touch screen panel 200 according to the present invention may include a sensing pattern 220 formed on one visible side surface of a substrate 210.

The sensing pattern 220 may provide information on X and Y coordinates of a touched point. More particularly, when a hand of a user or an object contacts a position, a change in capacitance to the contact position may be transmitted to a driving circuit through the sensing pattern 220, a trace 230 and a pad part (not illustrated). Then, the change in capacitance is converted into an electrical signal by X- and Y-input processing circuits (not illustrated) to thus identify the contact position.

The pad part (not illustrated) is located on one visible side surface (i.e. bezel part) of the substrate 210, and may include at least one pad (not illustrated) connected to the trace 230 and a soft circuit board (not illustrated).

The sensing pattern 220 may be formed using general transparent electrode materials known in the related art without particular limitation thereof. For example, such materials may include, indium-tin oxide (ITO), indium-zinc oxide (IZO), zinc oxide (ZnO), indium-zinc-tin oxide (IZTO), cadmium-tin oxide (CTO), poly(3,4-ethylenedioxythiopene) (PEDOT), carbon nanotube (CNT), metal wire, etc., which are used alone or in combination of two or more thereof. Preferably, ITO is used.

A thickness of the sensing pattern 220 is not particularly limited, however, may independently range from 10 to 150 nm. If the thickness is less than 10 nm, the resistance may be high to deteriorate sensitivity. When it exceeds 150 nm, the resistance may be reduced to increase power consumption.

The substrate 210 may be formed of any materials commonly used in the related art, and for example, may include glass, polyethersulfone (PES), polyacrylate (PAR), polyetherimide (PEI), polyethylene napthalate (PEN), polyethylene terepthalate (PET), polyphenylene sulfide (PPS), polyallylate, polyimide, polycarbonate (PC), cellulose triacetate (TAC), cellulose acetate propionate (CAP) or the like.

Further, the substrate 210 may be one visible side surface of the display panel 100.

The metal wiring 230 may be disposed on the one surface on a top side of a region corresponding to a boundary between pixels of the display panel 100, to connect the sensing pattern 220 with a pad part.

Since metal has low resistance, touch sensitivity can be improved by connecting the sensing pattern 300 with the pad part through the metal wiring 230.

However, the metal has high reflectance. Therefore, when it is employed in an image display device, it may reflect internal light emitted from a light source in the display device to hence decrease a transmittance of the display device.

However, the metal wiring 230 according to the present invention is disposed on the top side of the region corresponding to the boundary between pixels in the display panel 100, the region corresponding to the boundary between pixels in the display panel 100 is basically an area through which the internal light is not transmitted due to a black matrix layer (not illustrated), therefore, such a problem as a decrease in transmittance by the metal wiring 230 may not occur.

In this aspect, the metal wiring 230 may be arranged in such a way that its width is located on the top side of a region defined by a width of the boundary between pixels, preferably, the metal wiring may be formed to enable the center of the width to be disposed on a vertical top side in the center of the width of the boundary between pixels.

The metal wiring 230 of the present invention may be made of a metal material. For instance, the metal material may include molybdenum, silver, aluminum, copper, palladium, gold, platinum, zinc, lead, tin, titanium or an alloy thereof. Preferably, the metal wiring 230 according to the present invention may be formed of a metal material having a refractive index n of 0.03 to 4 and an extinction coefficient k of 2 to 7, among the metal materials described above.

A thickness of the metal wiring 230 is not particularly limited, but may range, for example, from 10 to 1,000 nm. If the thickness is less than 10 nm, the resistance is increased to reduce touch sensitivity. When the thickness exceeds 1,000 nm, the resistance is decreased to increase production costs.

According to the present invention, the arrangement between unit sensing patterns and the arrangement or direction of the metal wirings 230 to connect each unit sensing pattern 220 with the pad part are not particularly limited, but may be suitably selected in consideration of surface resistance, touch sensitivity, or the like.

For example, the sensing pattern 220 may include a plurality of unit sensing patterns 220 arranged at an interval, and the metal wiring 230 extends from each unit sensing pattern 220 to the bezel part closest thereto, so as to connect the sensing pattern 220 with the pad part on the bezel part.

When applying the touch screen panel 200 to the image display device, the touch screen panel may be divided into a display part for displaying an image and the bezel part as a frame part not to display the image. The image is displayed on only the display part and receives the touch function, therefore, the sensing pattern 220 is formed on the display part while the bezel part includes a circuit or the like formed therein.

As illustrated in FIG. 4, when the trace 230 extends from each of the unit sensing patterns 220 to the bezel part closest thereto, the trace formed on the display part may have a decreased length to exhibit low resistance, thereby improving touch sensitivity.

For the sensing patterns 220 at the uppermost row in FIG. 4, it is shown that a metal wiring extends to the bezel parts at left and right sides, respectively. However, if the metal wiring is more closely to the upper bezel part from the respective unit sensing patterns 220 than the left and right bezel parts, the metal wiring may also extend to the upper bezel part.

The touch screen panel according to the present invention, as illustrated in FIG. 5, may be disposed on the one surface on the top side of the region corresponding to the boundary between pixels in the display panel 100, and may further include an auxiliary sensing pattern 240 to cover the metal wiring 230.

The auxiliary sensing pattern 240 may be made of such a material that was exemplified as the material for the sensing pattern 220, preferably, formed of indium tin oxide (ITO).

When further including the auxiliary sensing pattern 240 to cover the metal wiring 230, the auxiliary sensing pattern 240 may reduce a reflectance of the metal wiring 230 to thus inhibit the metal wiring 230 from reflecting external light and being viewed from an outside.

The auxiliary sensing pattern 240 may have a thickness in such a range that was exemplified for the thickness of the sensing pattern 220. If the thickness of the auxiliary sensing pattern 240 is less than 30 nm or exceeds 150 nm, effects of reducing the reflectance of the metal wiring 230 may be insignificant.

[Preparation of Touch Screen Panel]

In addition, the present invention provides a method for manufacturing a touch screen panel.

Hereinafter, the method for manufacturing the touch screen panel according to one embodiment of the present invention will be described in detail.

First, a sensing pattern 220 is formed on one visible side surface of a substrate 210.

The raw material of the substrate 210 is not particularly limited but, for example, the substrate 210 may be formed of the same material as described above.

A method of forming the sensing pattern 220 is not particularly limited, but may include any conventional process known in the related art. For example, a variety of thin film deposition methods such as physical vapor deposition (PVD), chemical vapor deposition (CVD), or the like, may be used for forming the sensing pattern. For example, the sensing pattern may be formed by reactive sputtering as an example of PVD. Alternatively, the sensing pattern may be formed using a photolithography method.

The sensing pattern 220 may be formed of any transparent electrode material known in the related art. For example, the material may include indium-tin oxide (ITO), indium-zinc oxide (IZO), zinc oxide (ZnO), indium-zinc-tin oxide (IZTO), cadmium-tin oxide (CTO), or the like, which are used alone or in combination of two or more thereof. Preferably, indium-tin oxide (ITO) is used.

A thickness of the sensing pattern 220 is not particularly limited, but may range, for example, from 10 to 150 nm. If the thickness of the sensing pattern 220 is less than 10 nm, the resistance is too high, hence reducing touch sensitivity. When the thickness exceeds 150 nm, the transmittance is reduced to increase power consumption.

Thereafter, the trace 230 may be formed on the one surface to connect the sensing pattern 220 with the pad part.

According to another embodiment of the present invention, the sensing pattern 220 may include a plurality of unit sensing patterns 220, which are formed to be arranged at an interval, and the metal wiring 230 is formed to be extended from each unit sensing pattern 220 to the bezel part closest thereto and to connect the sensing pattern 220 with the pad part on the bezel part. In such a case, a trace formed on the display part may have a decreased length and reduced resistance, thus improving touch sensitivity.

Since a metal has low resistance, the touch sensitivity may be improved by connecting the sensing pattern 300 with the pad part through the metal wiring 230.

However, since the metal has high reflectance, it may reflect an internal light emitted from a light source of an image display device, hence reducing a transmittance of the display device when it is employed in the display device.

However, the present invention forms the metal wiring 230 on a top side of the region corresponding to the black matrix 220. Herein, this region is basically an area through which the internal light is not transmitted due to the black matrix 220, therefore, a problem such as a decrease in transmittance by the metal wiring 230 may not occur.

In this aspect, the metal wiring 230 may be formed in such a way that a width thereof is located on the top side of the region defined by the width of the black matrix 220, preferably, the metal wiring may be formed to enable the center of the width to be disposed on a vertical top side in the center of the width of the black matrix 220.

A method for manufacturing the metal wiring 230 is not particularly limited, but may include any conventional method known in the related art. For example, the metal wiring may be formed by a variety of thin-film deposition processes including physical vapor deposition (PVD), chemical vapor deposition (CVD) or the like. For example, the metal wiring may be formed by reactive sputtering as an example of PVD. Alternatively, the photolithography method may be used for forming the metal wiring.

The metal wiring 230 may be made of the metal material within the above range. Preferably, it may be formed of a metal material having a refractive index n of 0.03 to 4 and an extinction coefficient k of 2 to 7, among the metal materials illustrated above.

The metal wiring 230 may be formed with a thickness in the above-described range.

According to the present invention, the arrangement between the unit sensing patterns 220 and the arrangement or direction of the metal wiring 230 to connect each unit sensing pattern 220 with the pad part are not particularly limited, but may be suitably selected in consideration of surface resistance, touch sensitivity, or the like.

For example, the sensing pattern 220 may include a plurality of unit sensing patterns 220 arranged at an interval, and the metal wiring 230 extends from each unit sensing pattern 220 to the bezel part closest thereto, so as to connect the sensing pattern 220 with the pad part on the bezel part.

According to another embodiment of the present invention, the present invention may further include a process of forming an auxiliary sensing pattern 240 on the one surface to cover the metal wiring 230.

The auxiliary sensing pattern 230 may be made of such a material that was exemplified as the material for the sensing pattern 220, preferably, indium tin oxide (ITO).

When further including the auxiliary sensing pattern 230 to cover the metal wiring 230, the auxiliary sensing pattern 240 may reduce a reflectance of the metal wiring 230, to thus inhibit the metal wiring 230 from reflecting an external light and being viewed from the outside.

The auxiliary sensing pattern 240 may be formed by such a method that was exemplified as the method for forming the sensing pattern 220 within the above range.

The auxiliary sensing pattern 240 may be formed with a thickness in such a range that was exemplified for the thickness of the sensing pattern 220. If the thickness of the auxiliary sensing pattern 500 is less than 30 nm or exceeds 150 nm, effects of reducing the reflectance of the metal wiring 230 may be insignificant.

Other than the above description, additional processes known in the related art may be further used to produce the touch screen panel.

Preparative Example 1

A metal pattern with a thickness of 300 nm on a glass substrate (refractive index: 1.51) was formed of molybdenum (refractive index: 3.78, extinction coefficient: 3.52), then, another pattern with a thickness of 55 nm was formed of indium tin oxide (ITO) (refractive index: 1.89, extinction coefficient: 0.127) to cover a metal wiring on the above glass substrate, thereby fabricating a laminate illustrated in FIG. 6.

Preparative Example 2

A laminate was fabricated by the same procedures as described in Preparative Example 1, except that the indium tin oxide (ITO) (refractive index: 1.89, extinction coefficient: 0.127) pattern had a thickness of 30 nm.

Preparative Example 3

A laminate was fabricated by the same procedures as described in Preparative Example 1, except that the indium tin oxide (ITO) (refractive index: 1.89, extinction coefficient: 0.127) pattern had a thickness of 150 nm.

Preparative Example 4

A laminate was fabricated by the same procedures as described in Preparative Example 1, except that the metal pattern was formed of platinum (Pt) (refractive index: 2.1313, extinction coefficient: 3.17) instead of molybdenum.

Preparative Example 5

A laminate was fabricated by the same procedures as described in Preparative Example 1, except that the metal pattern was formed of copper (Cu) (refractive index: 0.944, extinction coefficient: 2.59) instead of molybdenum.

Preparative Example 6

An indium tin oxide (ITO) (refractive index: 1.89, extinction coefficient: 0.127) pattern with a thickness of 55 nm was formed on a glass substrate (refractive index: 1.51), and then, a metal pattern with a thickness of 300 nm was formed of molybdenum (refractive index: 3.78, extinction coefficient: 3.52) on the ITO pattern, thereby fabricating a laminate illustrated in FIG. 7.

Preparative Example 7

An indium tin oxide (ITO) (refractive index: 1.89, extinction coefficient: 0.127) pattern with a thickness of 55 nm was formed on a glass substrate (refractive index: 1.51), and then, a metal pattern with a thickness of 300 nm was formed of platinum (refractive index: 2.1313, extinction coefficient: 3.71) on the ITO pattern, thereby fabricating a laminate illustrated in FIG. 7.

Preparative Example 8

An indium tin oxide (ITO) (refractive index: 1.89, extinction coefficient: 0.127) pattern with a thickness of 55 nm was formed on a glass substrate (refractive index: 1.51), and then, a metal pattern with a thickness of 300 nm was formed of copper (refractive index: 0.944, extinction coefficient: 2.59) on the ITO pattern, thereby fabricating a laminate illustrated in FIG. 7.

Experimental Example (1) Measurement of Resistance of ITO Pattern

For each of the laminates fabricated in Referential Examples 1 to 7, a resistance of ITO pattern was measured.

Each of the laminates was fabricated by: depositing ITO with an area of 5 cm×5 cm on a glass substrate to form a sensing pattern, depositing a molybdenum pattern with an area of 5 cm×30 μm contacting the sensing pattern to form a metal pattern, then, depositing ITO again on the metal pattern to form an auxiliary sensing pattern. Thicknesses of indium tin oxide and molybdenum are listed in Table 1 below.

Thereafter, the resistance of ITO pattern was measured by a multimeter, and measured results are stated in Table 1 below.

TABLE 1

| Item | ITO thickness (nm) | Mo thickness (nm) | Relative resistance | Rate of change |
|---|---|---|---|---|
| Referential Example 1 | 55 | 0 | 100.0% | — |
| Referential Example 2 | 55 | 10 | 11.3% | −88.7% |
| Referential Example 3 | 55 | 50 | 4.5% | −95.5% |
| Referential Example 4 | 55 | 100 | 3.6% | −96.4% |
| Referential Example 5 | 55 | 300 | 3.0% | −97.0% |
| Referential Example 6 | 55 | 500 | 2.9% | −97.1% |
| Referential Example 7 | 55 | 1000 | 2.7% | −97.3% |

Referring to Table 1 above, it was found that the laminates in Referential Examples 2 to 7 had significantly reduced resistance of the sensing pattern, compared to the laminate in Referential Example 1.

(2) Measurement of Reflectance

Likewise, for each of the laminates fabricated in the above preparative examples, each reflectance at a wavelength range of 400 nm to 700 nm on A and B positions illustrated in FIG. 6 and FIG. 7, respectively, was measured by means of ST-4000 (KMAC).

Further, an average reflectance at the wavelength range of 400 nm to 700 nm was calculated on A and B positions, respectively, and results thereof were compared to each other.

TABLE 2

| Item | ITO thickness (nm) | Metal thickness (nm) | Average reflectance (%) | |
|---|---|---|---|---|
| | | | A position | B position |
| Preparative Example 1 | 55 | 300 | 17.85 | 19.16 |
| Preparative Example 2 | 30 | 300 | 13.29 | 35.53 |
| Preparative Example 3 | 150 | 300 | 12.39 | 41.43 |
| Preparative Example 4 | 55 | 300 | 17.85 | 28.71 |
| Preparative Example 5 | 55 | 300 | 17.85 | 50.32 |
| Preparative Example 6 | 55 | 300 | 17.85 | 57.23 |
| Preparative Example 7 | 55 | 300 | 17.85 | 63.39 |
| Preparative Example 8 | 55 | 300 | 17.85 | 71.73 |

Referring to Table 1 above, it can be seen that the laminates in Preparative Examples 1 to 5 exhibit a small difference in reflectance between A and B positions.

However, the laminates in Preparative Examples 6 to 8, respectively, had high reflectance on B position, thus exhibiting considerably increased difference in reflectance between A and B positions.

What is claimed is:

1. A touch display panel, comprising:
a touch screen panel disposed at a visible side of the touch display panel, the touch screen panel comprising:
   a substrate;
   a sensing pattern formed on one visible side surface of the substrate;
   a pad part located on the one visible side surface of the substrate;
   a soft circuit board connected to the pad part; and
   a metal wiring formed on the one surface on a top side of a region corresponding to a black matrix,
   wherein the sensing pattern includes a plurality of unit sensing patterns separated from each other at an interval; and
   the metal wiring extends from each unit sensing pattern in the display area to connect the unit sensing patterns with the pad part separately.

2. The touch screen panel according to claim 1, wherein the sensing pattern is formed of at least one material selected from a group consisting of indium tin oxide (ITO), indium zinc oxide (IZO), zinc oxide (ZnO), indium zinc tin oxide (IZTO) and cadmium tin oxide (CTO).

3. The touch screen panel according to claim 1, wherein the metal wiring extends from each unit sensing pattern to the bezel part closest thereto.

4. The touch screen panel according to claim 1, wherein the metal wiring is formed of molybdenum, silver, aluminum, copper, palladium, gold, platinum, zinc, tin, titanium or an alloy material thereof.

5. The touch screen panel according to claim 1, wherein the metal wiring has a thickness of 10 to 1,000 nm.

6. The touch screen panel according to claim 1, further comprising an auxiliary sensing pattern disposed on the one surface and above the boundary between pixels in the display panel, to cover the metal wiring.

7. The touch screen panel according to claim 6, wherein the auxiliary sensing pattern is formed of at least one material selected from a group consisting of indium tin oxide (ITO), indium zinc oxide (IZO), zinc oxide (ZnO), indium zinc tin oxide (IZTO) and cadmium tin oxide (CTO).

8. The touch screen panel according to claim 6, wherein the auxiliary sensing pattern has a thickness of 30 to 150 nm.

9. A method of fabricating a touch display panel, comprising:
   forming a sensing pattern including a plurality of unit sensing patterns separated from each other at an interval on one visible side surface of a substrate; and
   forming a metal wiring on the one surface to separately connect the each unit sensing pattern with a pad part,
   wherein the metal wiring is disposed on a top side of a region corresponding to a black matrix defined as a boundary between pixels in a display panel.

10. The method according to claim 9, wherein the sensing pattern is formed of at least one material selected from a group of indium tin oxide (ITO), indium zinc oxide (IZO), zinc oxide (ZnO), indium zinc tin oxide (IZTO) and cadmium tin oxide (CTO).

11. The method according to claim 9, wherein
the metal wiring is formed to be extended from each unit sensing pattern to the bezel part closest thereto, to connect the sensing pattern with a pad part on the bezel part.

12. The method according to claim 9, wherein the metal wiring has a thickness of 10 to 1,000 nm.

13. The method according to claim 9, wherein the metal wiring is formed of molybdenum, silver, aluminum, copper, palladium, gold, platinum, zinc, tin, titanium or an alloy material thereof.

14. The method according to claim 9, further comprising forming an auxiliary sensing pattern on the one surface to cover the metal wiring.

15. The method according to claim 14, wherein the auxiliary sensing pattern is formed of at least one material selected from a group consisting of indium tin oxide (ITO), indium zinc oxide (IZO), zinc oxide (ZnO), indium zinc tin oxide (IZTO) and cadmium tin oxide (CTO).

16. The method according to claim 14, wherein the auxiliary sensing pattern has a thickness of 30 to 150 nm.

* * * * *